Oct. 22, 1957     F. H. CHARTREY     2,810,521
RELAY ANNUNCIATOR
Filed March 15, 1955

INVENTOR
FRANCIS H. CHARTREY

BY
ATTORNEYS

United States Patent Office 2,810,521
Patented Oct. 22, 1957

2,810,521

RELAY ANNUNCIATOR

Francis H. Chartrey, Cornelius, Oreg.

Application March 15, 1955, Serial No. 494,585

5 Claims. (Cl. 235—92)

(Granted under Title 35, U. S. Code (1952), sec. 266)

The invention described herein may be manufactured and used by or for the Government of the United States of America for governmental purposes without the payment of any royalties thereon or therefor.

The present invention relates to electrical impulse counting annunciators and more particularly relates to an electrical impulse counting device with a single impulse reset, exhibiting features of fast action and compactness, which will provide positive repeat back indication of completed action and be highly suitable for display communication or other display purposes.

Prior art devices used for display purposes akin to the inventive device included illuminating dials, mechanical counter devices, electrical impulse counters using lights as indicators and electrical impulse counters using continuous stepping for reset. However, the prior art devices were too slow and cumbersome, were not readily adaptable for fast acting display purposes, were too bulky especially where used in quantity for airborne operations, lacked single pulse reset features and did not provide positive repeat back methods for indication of completed action.

The inventive device eliminates these and other disadvantages of the prior art and provides a device which is rugged in construction, compact in size suitable for airborne use in large quantities, quickly detachable for unit replacement, and which contains features of single impulse reset and a positive repeat back for indication of completed action.

Accordingly an object of the invention is to provide an annunciator for use as an electrical impulse counting device with a single impulse reset, which will be compact, fast acting, provide positive repeat back indication of completed action and which will be highly suitable for display communication and other display purposes.

Another object of the invention is to provide an electrical impulse counting annunciator which will be readily adaptable for fast acting display purposes, which will provide suitable compactness for uses such as airborne operations in equipment using the devices in quantity and which will present features of single pulse reset and positive repeat back indication of completed action.

Still another object of the invention is to provide an electrical impulse counting device suitable for display purposes which will be rugged in construction, be light, compact and suitable for use in airborne operations, and which may be made quickly detachable for unit replacement.

Other objects and many of the attendant advantages of this invention will be readily appreciated as the same becomes better understood by reference to the following detailed description when considered in connection with the accompanying drawings wherein.

Figure 1:
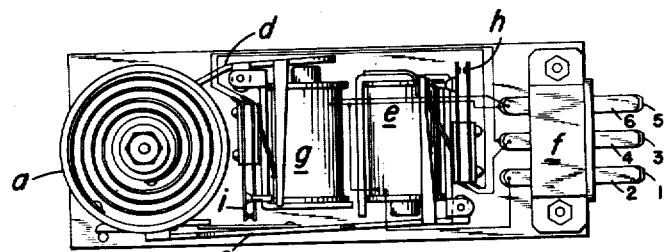
Fig. 1 is a plan view of a preferred embodiment of the device of the invention.
Figure 2:
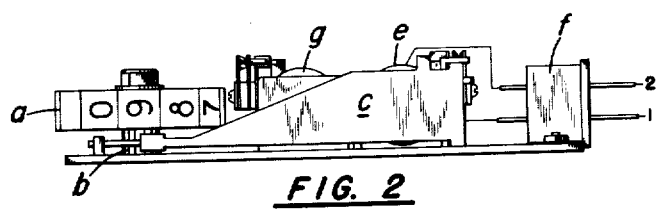
Fig. 2 is a side view of the device of Fig. 1.
Figure 3:
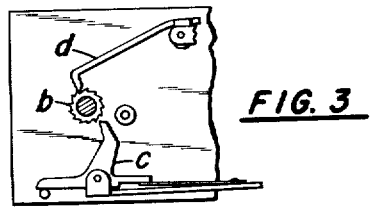
Fig. 3 is a detail presentation with portions broken away for the sake of clarity and illustrating the ratchet gear, stepping arm and reset arm mechanism of the illustrative embodiment of the invention, and, Fig. 4 is a schematic representation of the illustrative embodiment of the invention.

Referring now to the drawings wherein like reference characters designate like or corresponding parts throughout the several views there is shown in Fig. 1 a mechanical representation of a preferred embodiment of the inventive annunciator which operates as an electrical impulse counting device with a single impulse reset. It comprises a suitable spring loaded annunciator wheel $a$ which may present ten digits from one to zero (ten) on the face of the wheel as partially illustrated in Fig. 2. Wheel $a$ may be suitably attached to and preferably axially aligned with a ratchet gear $b$ which is stepped one position at a time by stepping arm $c$ and held in this position by reset arm $d$ when the reset arm is in ratchet engaging position (see Fig. 3).

Movement of the stepping arm $c$ is provided by energizing a suitable electrical solenoid $e$ through the appropriate wires and connector $f$. Reset of the annunciator wheel $a$ is accomplished by energizing a second solenoid $g$ which releases the ratchet gear $b$ and allows the spring loaded annunciator wheel $a$ to return to the blank or starting position.

In addition, two sets of moveable contacts $h$ and $i$ are provided and attached so as to be actuated by extensions $j$ and $k$ of the stepping arm $c$ and the reset arm $d$ only when the stepping arm $c$ has engaged the ratchet $b$ and moved it one notch and the reset arm $d$ has fallen into the holding notch for this position. The closing of these contacts $h$ and $i$ will provide one pulse which indicates that the stepping action for one pulse has been completed.

Figure 4:
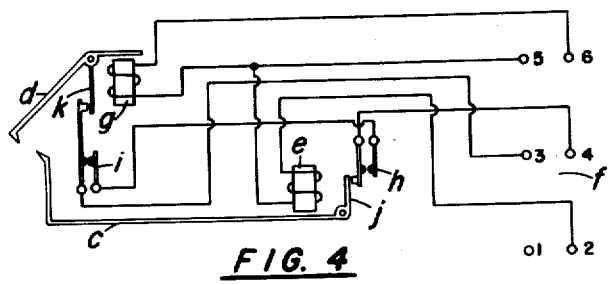

Referring to Fig. 4 of the drawings, the details of operation are as follows: an impulse is fed thru pin 2 of connector $f$ to the stepping solenoid $e$ energizing this solenoid and causing the stepping arm $c$ to be drawn into its magnetic field. This motion of the arm $c$ causes the pawl at the end of the stepping arm to engage a tooth on the ratchet gear $b$ and advance the annunciator wheel $a$ one position. During this action the reset arm $d$ is caused to slide up over one tooth of the ratchet $b$ and fall into the next notch holding the annunciator wheel $a$ at the new position. The stepping coil $e$ is then de-energized by the ending of the stepping pulse and the stepping arm $c$ is allowed to relax to its neutral position to await the next pulse.

During the stepping action, it will be noted by referring to Figs. 1 and 4, that at the extreme end of the travel of the stepping arm $c$ the extension of the stepping arm causes one set of contacts $h$ to close. At this moment the reset arm $d$ falls into the next notch in the ratchet $b$ and the extension on the reset arm $d$ allows the closing of the second set of contacts $i$. The closing of both sets of contacts at the same time causes a circuit to be completed between pins 3 and 4 of the connector $f$ and provides a pulse for repeat back of action completed. It should also be noted that should a malfunction occur whereas the reset arm $d$ did not fall into the next notch, no contact would be made and thus no repeat back signal would be initiated.

Reset is accomplished by feeding a pulse through pin 6 of connector $f$ to the reset solenoid $g$. Energizing of the reset solenoid $g$ causes the reset arm $d$ to be drawn into the magnetic field causing the arm $d$ to be disengaged from the ratchet thus allowing the spring loaded annunciator wheel $a$ to return to the blank or reset position.

The above description has presented an electrical impulse counting device with a positive repeat back feature to indicate completed action and including single pulse reset means (reset to blank position with one impulse) in a fast acting, compact device suitable for airborne use in large quantities and quickly detachable for unit replacement and which is highly suitable for display communication and other display purposes.

Obviously many modifications and variations of the present invention are possible in the light of the above teachings. It is therefore to be understood that within the scope of the appended claims the invention may be practiced otherwise than as specifically described.

What is claimed is:

1. An electrical impulse counting annunciator comprising information display means, actuating means responsive to impulse signals to advance said display means in step by step response to the signals, single pulse reset means responsive to single pulse reset signals to reset said information display means, and repeat back means comprising an electrical circuit and switch means controlled conjointly by said actuating means and said reset means to close said circuit momentarily upon each completed advancement of said display means.

2. An electrical impulse counting device comprising a spring loaded annunciator wheel having information displays at intervals along the circumferential face of the wheel, mechanism to move said wheel in steps, electrical means to actuate said mechanism, said last-named means being responsive to electrical pulse input to actuate said mechanism one step for each incoming electrical pulse, single pulse reset means to reset said wheel to an initial position on receiving a single reset pulse, and repeat back means comprising an electrical circuit and switch means controlled conjointly by said mechanism and said single pulse reset means to momentarily close said circuit.

3. An electrical impulse counting annunciator comprising a spring loaded annunciator wheel having a face marked with digital information consisting of spaced numbers, a ratchet gear adapted to be stepped one position at a time corresponding to a number on the face of said wheel, said ratchet gear being axially aligned with and attached to said wheel, a stepping arm to step said ratchet gear one position at a time, a reset arm normally set in ratchet gear engaging position to hold said ratchet gear in position, a first solenoid to actuate said stepping arm upon energization of said first solenoid stepping pulse input means to energize said first solenoid in response to an incoming pulse, a second solenoid to actuate said reset arm to ratchet gear disengaged position upon energization of said second solenoid, reset pulse input means to energize said second solenoid in response to an incoming reset pulse whereby said annunciator wheel may be returned to its initial position, and repeat back means comprising an electrical circuit and switch means controlled conjointly by said stepping arm and said reset arm to momentarily close said circuit upon each completed stepping movement of said annunciator wheel.

4. The combination of claim 5 in which said switch means comprises an extension on said stepping arm and an extension on said reset arm, a first and a second set of moveable contacts disposed to be actuated by the extensions of the stepping arm and the reset arm in ratchet engaging position of the stepping arm on moving the ratchet one notch and when the reset arm is in notch engaging position, closing of both contacts completing said electrical circuit to provide a repeat back pulse circuit for indicating that the stepping action for one pulse is completed.

5. An electrical impulse counting device comprising a spring loaded annunciator wheel having a plurality of indicia equally spaced along a circumferential face of said wheel, a ratchet gear attached to said wheel in axial alignment therewith, said gear having teeth equal in number to the indicia on said wheel, a stepping arm having a depending arm portion adjacent one end and having a pawl at the other end engageable with said ratchet gear for step by step rotation thereof, a reset arm having a portion adjacent one end engageable with said gear and having a depending portion adjacent the other end, said stepping arm being biased to ratchet gear disengaged position and said reset arm being biased to ratchet gear engaged position, a pair of normally closed contacts disposed to be operated by the depending portion of said reset arm, a pair of normally open contacts disposed to be operated by the depending arm portion of said stepping arm, stepping pulse input terminals, a stepping arm solenoid actuator connected to said stepping pulse input terminals, reset pulse input terminals, a reset arm solenoid actuator connected to said reset pulse input terminals, a repeat back circuit comprising a pair of terminals and a circuit connecting said normally open contacts and said normally closed contacts in series with said repeat back terminals whereby said repeat back circuit is momentarily closed upon each completed stepping movement of said annunciator wheel.

References Cited in the file of this patent

UNITED STATES PATENTS

| | | |
|---|---|---|
| 2,281,262 | Breitenstein | Apr. 28, 1942 |
| 2,324,321 | Peters | July 13, 1943 |

U. S. DEPARTMENT OF COMMERCE
PATENT OFFICE

CERTIFICATE OF CORRECTION

Patent No. 2,810,521                         October 22, 1957

Francis H. Chartrey

It is hereby certified that error appears in the printed specification of the above numbered patent requiring correction and that the said Letters Patent should read as corrected below.

Column 4, line 6, for the claim reference numeral "5" read -- 3 --.

Signed and sealed this 22nd day of April 1958.

(SEAL)
Attest:

KARL H. AXLINE
Attesting Officer

ROBERT C. WATSON
Commissioner of Patents